United States Patent

McKinney et al.

[11] Patent Number: 5,844,977
[45] Date of Patent: Dec. 1, 1998

[54] ON-HOOK CUSTOMER PREMISE EQUIPMENT ALERTING SIGNAL DETECTION

[75] Inventors: Brian Clifford McKinney; Stephen Kos, both of Calgary, Canada

[73] Assignee: Northern Telecom Limited, Montreal, Canada

[21] Appl. No.: 828,784

[22] Filed: Mar. 27, 1997

[51] Int. Cl.[6] ............................................. H04M 1/00
[52] U.S. Cl. .................... 379/164; 379/179; 379/202; 379/252
[58] Field of Search ................ 379/1, 9, 27, 34, 379/157, 158, 164, 179, 182, 183, 187, 199, 202, 206, 209, 215, 250, 252, 256, 257, 272, 273, 372, 373, 156, 93.01, 93.05, 93.14, 93.21, 345, 377, 391

[56] References Cited

U.S. PATENT DOCUMENTS

| | | | |
|---|---|---|---|
| 4,922,490 | 5/1990 | Blakley | 379/215 |
| 4,975,941 | 12/1990 | Morganstein et al. | 379/88 |
| 5,263,084 | 11/1993 | Chaput et al. | 379/142 |
| 5,319,702 | 6/1994 | Kitchin et al. | 379/386 |
| 5,544,235 | 8/1996 | Ardon | 379/177 |
| 5,613,006 | 3/1997 | Reese | 379/67 |
| 5,699,419 | 12/1997 | Ardon | 379/177 |

OTHER PUBLICATIONS

International Applicantion Published Under the Patent Cooperation Treaty (PCT), Publication Number WO 96/25816, Publication Date Aug. 22, 1996. PCT International Application Serial No. PCT/US96/01115 filed Feb. 12, 1996. Title: Caller ID and Call Waiting for Multiple CPEs on a Signal Telephone. Applicant: CIDCO, Incorporated.

International Application Published Under the Patent Cooperation Treaty (PCT), Publication Number WO 96/25825, Publication Date Aug. 22, 1996. PCT International Application Serial No. PCT/US96/01526 filed Feb. 13, 1996. Title: Method and Structure for Detecting a Customer Premises Equipment Alrerting Signal. Applicant: CIDCO, Incorporated.

*Primary Examiner*—Forester W. Isen
*Assistant Examiner*—Binh K. Tieu

[57] ABSTRACT

An apparatus for detecting customer premise equipment alerting signals (CAS) in a first telephone having a transmit circuit and a receive circuit and a hybrid line termination for connecting the transmit circuit and the receive circuit to a central office line. The apparatus includes an off-hook detector for producing an off-hook signal identifying whether or not the first telephone is in an off-hook state, an extension-in-use detector for producing an extension-in-use signal identifying whether or not a second telephone connected to the central office line is in an off-hook state, a CAS detector selectively operable to receive the CAS signals directly from the central office line and from the hybrid line termination and a control element for controlling the CAS detector in response to the off-hook signal and the extension-in-use signal. The control element acts to enable the CAS detector to monitor the CAS signals on the central office line directly when the second telephone is in the off-hook state and enable the CAS detector to monitor the CAS signals from the hybrid line termination when the first telephone is in an on-hook state, and the second telephone is in an off-hook state.

22 Claims, 3 Drawing Sheets

| Off Hook Det | Ext. In Use | MUX Sel | MUX Enable |
|---|---|---|---|
| 0 | 0 | X | disable |
| 0 | 1 | B | enable |
| 1 | 0 | A | enable |
| 1 | 1 | A | enable |

ON-HOOK CUSTOMER PREMISE EQUIPMENT ALERTING SIGNAL DETECTION

BACKGROUND OF THE INVENTION

This invention relates to telephones operable to receive Customer premise equipment Alerting Signals (CAS) and more particularly to telephones operable to receive CAS signals when on hook.

Conventional telephone circuits terminate a central office line with a hybrid termination circuit. To this circuit are connected transmit and receive paths of the telephone. The hybrid provides a portion of the transmit signal into the receive path so that the user can hear his/her own voice, when speaking.

In recent years telephone have been equipped with customer premise alerting signal detection circuitry which detects signals sent to the telephone from the central office to which it is connected. Conventionally, such circuits are connected to the receive path after the hybrid transmission circuit so that losses in the hybrid transmission circuit reduce the possibility of the user's voice interfering with in-coming signals received from the central office. Such interference may occur in the form of talk-off which causes signal detectors to falsely detect the user's voice as a central office signal and talk-down where the user's voice swamps out the incoming signals from the central office. Furthermore, typically, when a telephone is on-hook, no signals are provided to the hybrid transmission circuit and therefore customer premise equipment alerting signals cannot be detected.

The above problem has been addressed by connecting signal detection circuitry directly to the central office line, however, the user's voice is no longer attenuated by the hybrid transmission circuit and talk-off and talk-down problems are still present.

What would be desirable therefore is the ability to detect customer premise alerting signals through the hybrid transmission circuit when the telephone is off-hook and the ability to detect such signals directly from the central office line when the telephone is on-hook.

The present invention addresses this need.

BRIEF SUMMARY OF THE INVENTION

In accordance with one aspect of the invention there is provided an apparatus for detecting customer premise equipment alerting signals (CAS) in a first telephone having a transmit circuit and a receive circuit and a hybrid line termination for connecting the transmit circuit and the receive circuit to a central office line. The apparatus includes an off-hook detector for producing an off-hook signal identifying whether or not the first telephone is in an off-hook state, a CAS detector selectively operable to receive the CAS signals directly from the central office line and from the hybrid line termination and a control element for controlling the CAS detector in response to the off-hook signal. The control element acts to enable the CAS detector to monitor the CAS signals on the central office line directly when the telephone is in the on-hook state and to enable the CAS detector to monitor the CAS signals from the hybrid line termination when the first telephone is in an off-hook state.

The apparatus may include an extension-in-use detector for producing an extension-in-use signal identifying whether or not a second telephone connected to the central office line is in an off-hook state and preferably, the control element is operable to further control the CAS detector to enable the CAS detector to monitor the CAS signals directly from said central office when the first telephone is in an on-hook state and the second telephone is in an off-hook state.

The apparatus may include a first buffer circuit having first buffer inputs connected to the hybrid line termination and a second buffer having second buffer inputs connected directly to the central office line, the first buffer and the second buffer having first and second buffer outputs respectively, the control element having first and second control element inputs, and a control element output, the first buffer output being connected to the first control element input and the second buffer output being connected to the second control element input and the control element output being connected to the CAS detector.

Preferably, the control element further has at least one control input for connecting either the first control element input to the control element output or for connecting the second control element input to the control element output in response to the off-hook signal and the extension-in-use signal.

Preferably, the control element includes a multiplexer.

Preferably, the apparatus includes a processor in communication with the off-hook detector, the extension-in-use detector and the control element and Preferably, the processor is programmed to alter the state of the control input in accordance with the off-hook signal and the extension-in-use signal.

Preferably, the processor is programmed to render the control input active to connect the first control element input to the control element output when the off-hook signal is active.

Preferably, the processor is programmed to render the control input inactive when the off-hook signal and the extension-in-use signal are both inactive.

Preferably, the processor is programmed to render the control input active when the off-hook signal is inactive and the extension-in-use signal is active.

Preferably, the off-hook detector includes a circuit for measuring loop current in the central office line and for rendering the off-hook signal active when the loop current is above a pre-defined value.

Preferably, the extension-in-use detector includes a voltage sensor for sensing the measured voltage across the central office line and for rendering the extension-in-use signal active when the measured voltage is less than a predefined value.

In accordance with another aspect of the invention, there is provided a method of detecting CAS signals in a first telephone having a transmit circuit and a receive circuit and a hybrid line termination connecting the transmit circuit and the receive circuit to a central office line to which a second telephone is connected. The method includes the steps of;

a) enabling a CAS detector to monitor the CAS signals on the central office line directly when the second telephone is in an on-hook state; and b) enabling the CAS detector to monitor the CAS signals from the hybrid line termination when the first telephone is in an off-hook state.

The method may include the step of enabling the CAS detector to monitor the CAS signals from said central office when the first telephone is in an on-hook state and the second telephone is in an off-hook state.

Preferably, the method further includes the step of producing an active off-hook signal when the first telephone is in an off-hook state.

Preferably, the method further includes the step of producing an active extension-in-use signal when the second telephone connected to the central office line is in an off-hook state.

The method may include the step of connecting either a first control element input of a control element to a control element output of the control element or connecting a second control element input to the control element output in response to the off-hook signal and the extension-in-use signal.

Preferably, the method further includes the step of producing a control input signal for controlling the control element in response to the off-hook signal and the extension-in-use signal.

The method may include the step of rendering the control input in signal active to connect the first control element input to the control element output when the off-hook signal is active.

The method may include the step of rendering the control input inactive when the off-hook signal and the extension-in-use signal are both inactive.

The method may include the step of rendering the control input active when the off-hook signal is inactive and the extension-in-use signal is active.

Thus, the apparatus detects customer premise alerting signals through the hybrid transmission circuit when the telephone is off-hook, thereby achieving the advantages of hybrid transmission circuit losses between the transmit signal path and the receive signal path. However, the hybrid transmission circuit does not pass signals when the telephone is on-hook, Therefore, the apparatus detects customer premise alerting signals directly from the central office line when the telephone is on-hook. This allows such signals to be detected whether the telephone is on or off hook.

BRIEF DESCRIPTION OF THE SEVERAL VIEWS OF THE DRAWING

In drawings which illustrate embodiments of the invention,

FIG. 3 is a table illustration control element selection according to off-hook and extension-in-use signals.

DETAILED DESCRIPTION OF THE INVENTION

Figure 1:
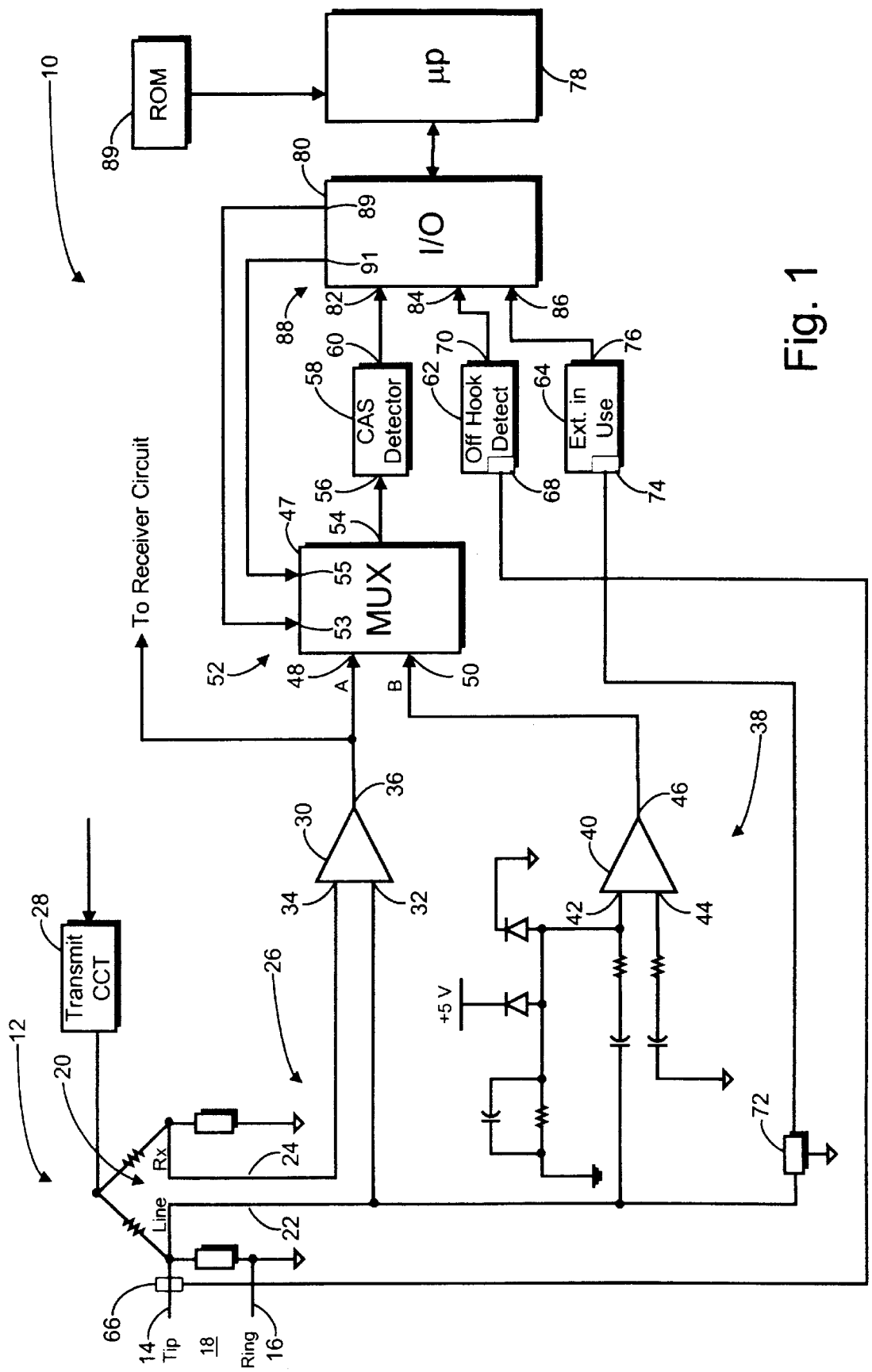
FIG. 1 is a block diagram of an apparatus according to a first embodiment of the invention.

Referring to FIG. 1, an apparatus for enabling a central office to notify a user of a call waiting in a telephone on hook and where an extension is in use, is shown generally at 10.

The apparatus is part of a telephone having a central office line termination 12 for connecting to conventional tip and ring connections 14 and 16 of a central office line 18. The central office line termination 12 includes a conventional hybrid transmission circuit 20 which is connected to the conventional tip and ring connections 14 and 16 of the central office line 18 and which provides line and receive signals 22 and 24 to a post-hybrid receive signal path 26 of the telephone.

The hybrid transmission circuit 20 also receives transmission signals from a transmit circuit 28 of the telephone for transmission to the central office. The hybrid line termination thus connects the transmit circuit and the receive circuit to the central office line. Effectively, the hybrid transmission circuit 20 couples the received signals to the post hybrid receive signal path and couples a portion of the transmission signals to the post-hybrid receive signal path 26 to allow a user to hear a portion of the signal being transmitted to the central office.

The post-hybrid receive signal path 26 includes a first buffer amplifier 30 having inputs 32 and 34 for receiving signals from the line and receive signals 22 and 24 and a first buffer output 36 for providing a post hybrid buffered signal to conventional receiver circuits (not shown) in the telephone. Thus the post-hybrid receive signal path receives signals from the central office through the hybrid transmission circuit 20.

The apparatus further includes a pre-hybrid receive signal path 38 which includes a second buffer amplifier 40 having third and fourth inputs 42 and 44 capacitively coupled directly to the tip and ring connections 14 and 16. The second buffer amplifier 40 further has an a second buffer output 46 for providing a pre-hybrid buffered output signal.

The apparatus further includes a multiplexer 47 which acts as a control element having first and second control element inputs 48 and 50, control inputs shown generally at 52 and a control output 54. The multiplexer 47 is operable to connect either the first control element input 48 to the control element output 54 or to connect the second control element input 50 to the control element output 54, in response to signals received at the control inputs 52. The control inputs 52 include a select input 53 and an enable input 55, the select input being operable to select whether the first control element input 48 is connected to the control element output 54 or whether the second control element input 50 is connected to control element output 54.

The control element output is connected to a Customer premise equipment Alerting Signal (CAS) input 56 of a CAS detector 58 having an output 60. The CAS detector is operable to detect and receive a customer premise equipment alerting signal presented at its input 56 in the form of a dual tone signal having frequencies of 2130 and 2750 Hz. In response, the CAS detector produces an active output signal at its output 60 to indicate that a CAS signal has been received at its input 56.

Off-hook Detector

The apparatus further includes an off-hook detector 62 and an extension-in-use detector 64. The off-hook detector 62 includes a current measurement circuit 66 for measuring loop current in the central office line. A current measurement signal is produced by the current measurement circuit to represent the measured current in the central office line 18. The current measurement signal is provided to a first comparator circuit 68 which produces an active off-hook signal when the measured loop current is greater than a pre-defined value. The pre-defined value is approximately equal to, but slightly greater than the current measured when the telephone is on-hook. The off-hook detector thus has an output 70 which provides an active off-hook signal when the telephone is in an off-hook state. Thus the off-hook detector identifies whether or not the first telephone is in an off-hook state.

Extension-in-use Detector

The extension-in-use detector 64 includes a voltage sensing circuit 72 for sensing the measured voltage across the central office line 18 and for producing a voltage signal representing the measured voltage. The extension-in-use detector further includes a second comparator circuit 74 which produces an active extension-in-use signal when the measured line voltage is less than a pre-defined value, where the pre-defined value represents the voltage measured when the first telephone is off-hook. The extension-in-use detector thus has an output 76 which provides an active extension-in-use signal identifying whether or not a second telephone connected to the central office line is in an off-hook state.

Thus, the extension-in-use detector identifies when an extension telephone connected to the same central office line is off-hook.

The apparatus further includes a microprocessor 78 in communication with an input/output I/O port 80. The I/O port 80 has a CAS input 82, an off-hook detect input 84, an extension-in-use input 86 and control outputs shown generally at 88 including a select output 89 and an enable output 91. The CAS input 82 is connected to the CAS detector output 60 to receive the CAS detect signal, the off-hook detect input 84 is connected to the off-hook detector output 70 to receive the off-hook signal, the extension-in-use input 86 is connected to the extension-in-use output 76 to receive the extension-in-use signal and the control outputs 88 are connected to the control inputs 52 of the multiplexer 47. All signals received at the I/O port and provided by the I/O port are digital signals. By reading from registers (not shown) in the I/O port 80 the microprocessor can determine the states of the signals received at inputs 82, 84, and 86 and by writing to registers in the I/O port, the microprocessor can change the state of the control outputs 88. Thus the apparatus includes a processor in communication with the off-hook detector, the extension-in-use detector and the control element.

Figure 2:
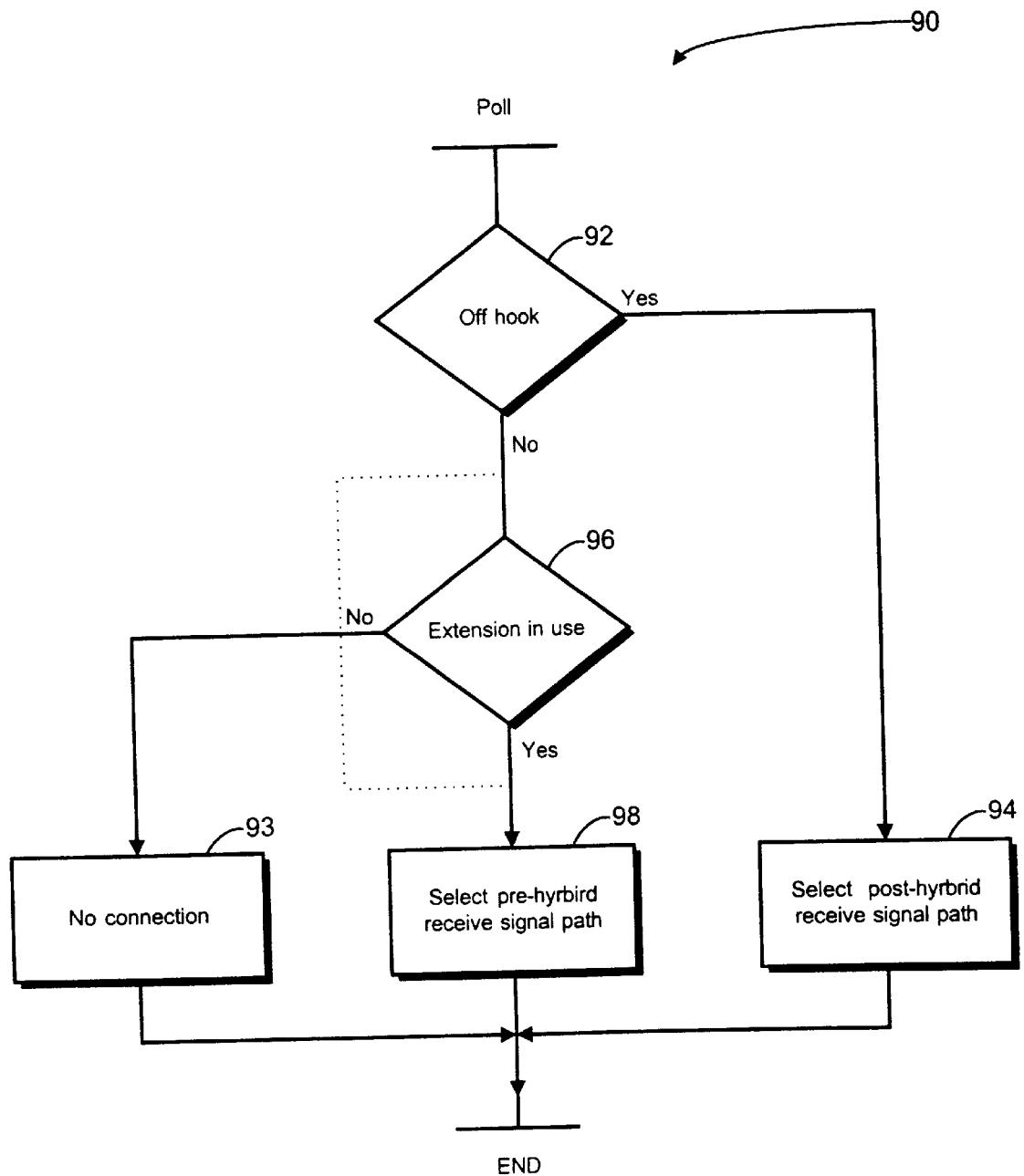
FIG. 2 is a flowchart of a control algorithm according to the first embodiment of the invention.

The processor is programmed to alter the state of the control input in accordance with the off-hook signal and the extension-in-use signal according to a control algorithm as shown at 90 in FIG. 2.

The control algorithm is implemented by blocks of microprocessor readable code stored in a Read Only Memory 89 in communication with the microprocessor 78. The blocks of code implement functional blocks of the control algorithm 90. Specific codes for this purpose will be readily ascertained by one of ordinary skill in the art with reference to the functional blocks of FIG. 2 and a user's manual for the microprocessor. In this embodiment, the microprocessor is a Motorola MC68HC705LN56.

The control algorithm is called every few microseconds by a main algorithm run by the microprocessor which directs the microprocessor 78 to perform other conventional functional telephone operations. Each time the control algorithm is called, it begins with block 92 which directs the microprocessor 78 to read the I/O port to determine the status of the off-hook and extension-in-use signals.

Off-hook Active

At block 92 if the off-hook signal is active, the microprocessor 78 is directed to block 94 which causes it to render the control outputs 88 active such that the second control element input 50 is connected to the control element output 54 such that the CAS detector input 56 receives signals from the post-hybrid receive signal path 26. Thus the processor is programmed to render the control input active to connect the first control element input to the control element output when the off-hook signal is active.

Off-hook and Extension-in-use Inactive

If at block 92, the off-hook signal is inactive, block 96 directs the microprocessor 78 to determine whether or not the extension-in-use signal is active. If the extension-in-use signal is not active, processing continues at block 93 which directs the microprocessor 78 to render the control outputs 88 inactive such that there is no connection between either of the inputs 48 and 50 and the control element output 54. Thus, the processor is programmed to render the control inputs inactive when both the off-hook signal and the extension-in-use signal are inactive.

Off-hook Inactive and extension-in-use Active

If at block 96 the extension-in-use signal is active, block 98 directs the microprocessor 78 to render the control input inactive such that the second control element input 50 is connected to the control element output 54 such that the CAS detector input 56 receives signals from the pre-hybrid receive signal path 38. Thus, the processor is programmed to render the control input active when the off-hook signal is inactive and the extension-in-use signal is active.

A table illustrating the connection of the first and second control element inputs to the control element output is shown generally at 100 in FIG. 3.

It will be appreciated that the microprocessor and multiplexer together act as a control element for controlling the CAS detector in response to the off-hook signal and the extension-in-use signal to enable the CAS detector to monitor the CAS signals on the central office line directly when the second telephone is in the off-hook state and to enable the CAS detector to monitor the CAS signals directly from the central office when the first telephone is in an on-hook state, and the second telephone is in an off-hook state. Thus, the CAS detector is selectively operable to receive the CAS signals directly from the central office line and from the hybrid line termination according to the off-hook signal and the extension-in-use signal.

The above embodiment, permits CAS signals to be detected when the telephone is on-hook and an extension is in use.

Referring to FIG. 2, an apparatus according to a second embodiment of the invention, for enabling a central office to notify a user of a call waiting in a telephone on hook regardless of whether or not an extension is in use, includes the circuit shown in FIG. 1, and the control algorithm shown in FIG. 2, with the exception that blocks 96 and 93 are omitted. In this embodiment, the flow of processing is directly from block 92 to block 98 when the telephone is on-hook, independently of whether or not an extension is or is not in use. Thus, in this embodiment, when the telephone is on-hook, the CAS detector receives CAS signals directly from the central office line and when the telephone is off-hook the CAS detector receives such signals through the hybrid transmission circuit.

The above embodiment, permits CAS signals to be detected when the telephone is on-hook regardless of whether or not an extension is in use.

Thus, the apparatus detects customer premise alerting signals through the hybrid transmission circuit when the telephone is off-hook, thereby achieving the advantages of hybrid transmission circuit losses between the transmit signal path and the receive signal path. However, the hybrid transmission circuit does not pass signals when the telephone is on-hook, Therefore, the apparatus detects customer premise alerting signals directly from the central office line when the telephone is on-hook and detects customer premise alerting signals from the hybrid transmission circuit when the telephone is off-hook.

While specific embodiments of the invention have been described and illustrated, such embodiments should be considered illustrative of the invention only and not as limiting the invention as construed in accordance with the accompanying claims.

What is claimed is:

1. An apparatus for detecting customer premise equipment alerting signals (CAS) in a first telephone having a transmit circuit and a receive circuit and a hybrid line termination for connecting said transmit circuit and said receive circuit to a central office line; the apparatus comprising:

a) an off-hook detector for producing an off-hook signal identifying whether or not said first telephone is in an off-hook state;

b) a CAS detector selectively operable to receive said CAS signals directly from said central office line and from said hybrid line termination;

d) a control element for controlling said CAS detector in response to said off-hook signal to:
   i) enable said CAS detector to monitor said CAS signals on said central office line directly when said telephone is in an on-hook state; and
   ii) enable said CAS detector to monitor said CAS signals from said hybrid line termination when said first telephone is in an off-hook state.

2. An apparatus as claimed in claim 1 further including an extension-in-use detector for producing an extension-in-use signal identifying whether or not a second telephone connected to said central office line is in an off-hook state and wherein said control element is operable to further control said CAS detector to enable said CAS detector to monitor said CAS signals directly from said central office when said first telephone is in an on-hook state and said second telephone is in an off-hook state.

3. An apparatus as claimed in claim 2 further including a first buffer circuit having first buffer inputs connected to said hybrid line termination and a second buffer having second buffer inputs connected directly to said central office line, said first buffer and said second buffer having first and second buffer outputs respectively, said control element having first and second control element inputs, and a control element output, said first buffer output being connected to said first control element input and said second buffer output being connected to said second control element input and said control element output being connected to said CAS detector.

4. An apparatus as claimed in claim 3 wherein said control element further has at least one control input for connecting either said first control element input to said control element output or for connecting said second control element input to said control element output in response to said off-hook signal and said extension-in-use signal.

5. An apparatus as claimed in claim 4 wherein said control element includes a multiplexer.

6. An apparatus as claimed in claim 5 further including a processor in communication with said off-hook detector, said extension-in-use detector and said control element and wherein said processor is programmed to alter the state of said control input in accordance with said off-hook signal and said extension-in-use signal.

7. An apparatus as claimed in claim 6 wherein said processor is programmed to render said control input active to connect said first control element input to said control element output when said off-hook signal is active.

8. An apparatus as claimed in claim 7 wherein said processor is programmed to render said control input in active when said off-hook signal and said extension-in-use signal are both inactive.

9. An apparatus as claimed in claim 8 wherein said processor is programmed to render said control input active when said off-hook signal is inactive and said extension-in-use signal is active.

10. An apparatus as claimed in claim 9 wherein said off-hook detector includes a circuit for measuring loop current in said central office line and for rendering said off-hook signal active when said loop current is above a pre-defined value.

11. An apparatus as claimed in claim 10 wherein said extension-in-use detector includes a voltage sensor for sensing the measured voltage across said central office line and for rendering said extension-in-use signal active when said measured voltage is less than a pre-defined value.

12. A method of detecting CAS signals in a first telephone having a transmit circuit and a receive circuit and a hybrid line termination connecting said transmit circuit and said receive circuit to a central office line to which a second telephone is connected, the method comprising the steps of;

a) enabling a CAS detector to monitor said CAS signals on said central office line directly when said second telephone is in an on-hook state; and b) enabling said CAS detector to monitor said CAS signals from said hybrid line termination when said first telephone is in an off-hook state.

13. A method as claimed in claim 12 further including the step of enabling said CAS detector to monitor said CAS signals directly from said central office when said first telephone is in an on-hook state and said second telephone is in an off-hook state.

14. A method as claimed in claim 13 further including the step of producing an active off-hook signal when said first telephone is in an off-hook state.

15. A method as claimed in claim 14 further including the step of producing an active extension-in-use signal when said second telephone connected to said central office line is in an off-hook state.

16. A method as claimed in claim 15 further including the step of connecting either a first control element input of a control element to a control element output of said control element or connecting a second control element input to said control element output in response to said off-hook signal and said extension-in-use signal.

17. A method as claimed in claim 16 further including the step of producing a control input signal for controlling said control element in response to said off-hook signal and said extension-in-use signal.

18. A method as claimed in claim 17 further including the step of rendering said control input signal active to connect said first control element input to said control element output when said off-hook signal is active.

19. A method as claimed in claim 18 further including the step of rendering said control input inactive when said off-hook signal and said extension-in-use signal are both inactive.

20. A method as claimed in claim 19 further including the step of rendering said control input active when said off-hook signal is inactive and said extension-in-use signal is active.

21. A method as claimed in claim 20 further including the steps of measuring loop current in said central office line and rendering said off-hook signal active when the loop current is above a pre-defined value.

22. A method as claimed in claim 21 further including the steps of sensing the measured voltage across the central office line and rendering the extension-in-use signal active when the measured voltage is less than a pre-defined value.

* * * * *